Aug. 10, 1965 R. J. GUGLIELMO 3,200,085
RADIATION BARRIER MATERIAL AND METHOD OF MAKING THE SAME
Filed March 2, 1959
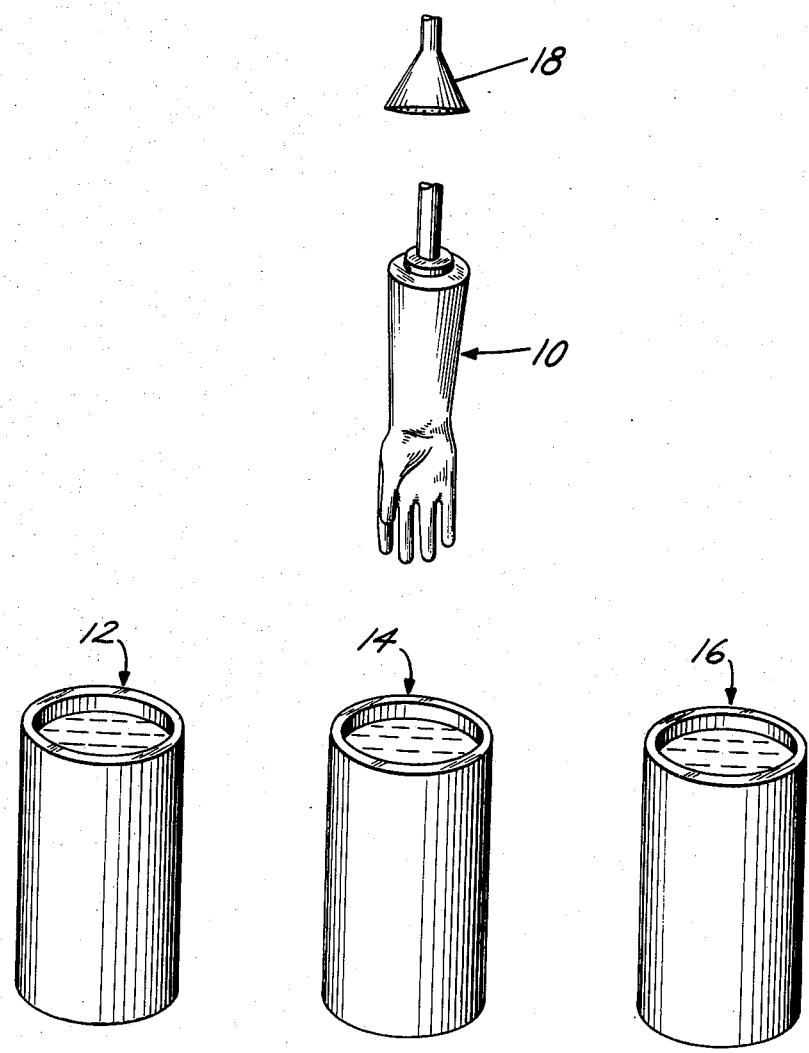
INVENTOR.
RICHARD J. GUGLIELMO
BY Kane, Dalsimer and Kane
ATTORNEYS 3,200,085
RADIATION BARRIER MATERIAL AND
METHOD OF MAKING THE SAME
Richard J. Guglielmo, Cresskill, N.J., assignor to Arthur
L. Barber, Jr., Alpine, N.J.
Filed Mar. 2, 1959, Ser. No. 796,516
14 Claims. (Cl. 252—478)

This invention relates to an improved radiation barrier material and method of making the same and more particularly to a radiation barrier film which may be used in making clothing, coverings, and coatings for attenuating and providing protection against certain types of radiations.

Heretofore, satisfactory radiation barriers have been made in relatively rigid or massive form. Attempts have also been made to provide satisfactory radiation barriers in the form of films, particularly flexible films which may be used in making clothing for the protection of personnel and also various types of coatings and coverings. However, the flexible films heretofore available for this purpose have not been satisfactory. Thus, many of the proposed films do not have sufficient density to provide significant protection against or attenuation of the radiation. In addition, certain of the proposed barrier materials could not readily be formed into articles of clothing by simple procedures, such as dipping operations, due to the high viscosity thereof. Furthermore, a number of the proposed films are relatively inflexible and in other instances the tensile strength thereof is relatively low whereby the utility of the material is relatively limited.

It is an object of the present invention to overcome the difficulties and disadvantages heretofore encountered and to provide an improved radiation barrier film which has a very high percentage of dense barrier material incorporated therein so that it will significantly attenuate and provide protection against certain types of radiation; which is relatively simple to make and is subject to being cast, formed, molded, dipped, sprayed and otherwise fabricated into various types of protective articles, coverings and coatings; and which may be made in flexible form and has relatively high tensile strength so that it may be used in making articles of clothing.

In carrying out my invention, I suspend a relatively high proportion of dense, heavy metal particles, such as lead, in a binder made from an improved resin dispersion of carefully selected and controlled rheology. Thus, I have found that a relatively higher proportion of heavy metal particles can be suspended in the binder by employing a resin dispersion having thixotropic characteristics with a relatively high apparent viscosity when in a state of rest prior to shearing, but which when subjected to shearing action will flow so that articles may be readily made therefrom particularly by dipping, spraying and brushing. Materials embodying my invention may also be subjected to other forming operations, such as casting, molding and coating operations and for this purpose, I may incorporate other rheological characteristics in addition to thixotropy.

I have also found that a homogeneous system can be obtained by using liquid dispersants in the resin dispersion having closely related surface tension values. A higher density material can be obtained by using a proportion of resin particles in the binder of relatively large size having relatively less surface to wet by the dispersant and also by using heavy metal particles of relatively larger and relatively smaller size whereby the particles may be more densely packed together. By eliminating the entrained gases contained in the system or reducing them to an absolute minimum, I have found that further improvements can be obtained in both the density and characteristics of the material.

Under certain circumstances, I find it desirable to use a resin dispersion of controlled rheology and having a liquid dispersant which includes both a plasticizer and a monomer or prepolymer. Further aspects of my invention contemplate the provision of a high density, flexible barrier film of improved tensile strength by applying to one or both surfaces of the barrier film a thin layer of resin dispersion material integrally coated, bonded or laminated thereto. Other aspects of my invention contemplate an improved dipping procedure whereby articles may be readily made from resin dispersions by dipping operations in a simplified manner without the difficulties arising by reason of flowing or dripping of the material. Thus, between successive dipping operations, the dipping form with the prior dipping coats thereon is immersed into a liquid having a high boilng point heated to a temperature above the gelling point of the resin dispersion whereby the successive resin dispersion coats are rapidly heated and gelled eliminating dripping or flowing.

In the accompanying drawing, I have shown in perspective a dipping form together with tanks containing resin dispersions and a heating liquid of a type which may be used in performing the dipping operations under one aspect of my invention.

In carrying out my invention, I first prepare an improved resin dispersion of controlled rheology with thixotropic characteristics and then suspend a high proportion of heavy metal particles therein.

The resin components of the dispersion should be in finely-divided form so that it can be suspended in a liquid consisting of one or more plasticizers or one or more plasticizers and one or more monomers or prepolymers. For this purpose, I prefer to use finely-divided vinyl chloride polymers or copolymers of the type used in plastisols and organosols since I have found that due to their high molecular weight and other characteristics the vinyl chloride polymers and copolymers can bind after curing a very high proportion of heavy metal particles therein. However, I may also employ other resins in finely-divided form, as for instance—ethyl cellulose, cellulose acetate and the acrylates.

It is desirable to use resin particles of varying size with some relatively smaller size in the order of approximately one micron or less and the remainder of varying larger sizes. I have found that satisfactory results are obtained by using larger resin particles varying in size between one micron and approximately one hundred microns in size but larger particle sizes may be employed. In this connection, I prefer to employ in excess of approximately ten percentage of the larger resin particles because I can then suspend a relatively higher proportion of heavy metal particles in the dispersion. When larger average particle sizes are employed, a smaller surface area is present per unit of volume and accordingly less liquid dispersant is required to wet the surfaces of the resin and the dispersant can therefore be used to wet a larger proportion of heavy metal particles.

The resin particles are dispersed in a liquid dispersant which may be either:

(1) A mixture of a plurality of liquid plasticizers, or
(2) A mixture of one or more liquid plasticizers and one or more monomers or prepolymers.

In either event, the plasticizers should be compatible with each other and with the other components of the dispersion. Where a monomer or prepolymer is used, at least one of the plasticizers should be a solvent for the monomer or prepolymer since I utilize the solvent type of polymerization.

In preparing plastisols, it is generally desirable to use more than one plasticizer in the liquid dispersant in order to obtain the desired characteristics. I prefer to blend several plasticizers together in preparing my liquid dispersant. Due to the high proportion of heavy metal particles used in my preparation, the resin dispersion is subject to high internal stresses with the result that there is a tendency for the plasticizers to bleed or separate from each other, causing undesirable striations in articles formed therefrom. I have found that this bleeding or separation can be avoided by using plasticizers having compatible surface tensions (i.e., surface tensions of nearly equal value). In this connection, the surface tensions of the several plasticizers blended together should preferably be substantially the same and, at any rate, should not vary more than approximately three dynes per square centimeter at the temperatures at which the dispersion is prepared, stored and used.

The plasticizers employed should preferably be in the form of non-polymerizing esters, either monomeric or polymeric, although natural or synthetic plasticizers may also be used. The following is a list of representative plasticizers, together with their surface tensions indicated in dynes per square centimeter at approximately 20° C.:

| Plasticizer | Trade name | Surface Tension at Dynes Per Square Centimeter at 20° C. |
|---|---|---|
| Di-2-Ethylhexyl Adipate | Adipol 2 EH | 29 |
| n-Octyl n-Decyl Adipate | Adipol ODY | 29 |
| Di-Isodecyl Phthalate | Di-Isodecyl Phthalate | 29 |
| Tributyl Phosphate | Tributyl Phosphate | 29 |
| Primary Plasticizer | KP-220 | 29 |
| Mixed Octyl Fatty Acid Esters | Ohopex R-9 | 29 |
| Di-Iso-Octyl Adipate | Adipol 10A | 30 |
| Isodecyl Octyl Adipate | Adipol 810 | 30 |
| Di-Isodecyl Adipate | Adipol XX | 30 |
| Tri-Butoxyethyl Phosphate | KP-140 | 30 |
| Butyl Oleate | Butyl Oleate | 30 |
| Butyl Stearate | Butyl Stearate | 30 |
| Butoxyethyl Stearate | KP-23 | 31 |
| n-Octyl n-Decyl Phthalate | Dinopol 235 | 31 |
| Isodecyl Octyl Phthalate | Dinopol 1 DO | 31 |
| Mixed Octyl Phthalates | Dinopol MOP | 32 |
| Di-Iso-Octyl Phthalate | DIOP | 32 |
| Epoxy Plasticizer | KP-90 | 32 |
| Octyl Fatty Phthalic Acid Esters. | Ohopex Q-10 | 32 |
| Di-Butoxyethyl Adipate | Adipol BCA | 33 |
| Di-Butoxyethyl Phthalate | Kronisol | 33 |
| Di-2-Ethylhexyl Phthalate | Dioctyl Phthalate | 33 |
| Methoxyethyl Oleate | Kapsol | 34 |
| Dibutyl Phthalate | Dibutyl Phthalate | 35 |
| Bis-(Dimethyl Benzyl) Ether | KP-555 | 35 |
| Tricresyl Phosphate | Kronitex K-3 | 37 |
| Tricresyl Phosphate | Kronitex AA | 39 |
| Bis (Diethylene Glycol Monoethyl Ether) Phthalate. | Di Carbitol Phthalate | 40 |
| Tricresyl Phosphate | Kronitex I | 40 |
| Cresyl Phenyl Phosphate | Kronitex MX | 42 |
| Di-Methoxyethyl Phthalate | Methex | 43 |

Where a monomer or prepolymer is mixed with the liquid plasticizers in the dispersant, it should, of course, be compatible with the other materials in the dispersion, both in its monomeric and polymeric state. In addition, it should have a relatively high boiling point, should reduce the initial viscosity of the dispersion, and lastly—it should increase the strength of the film after curing. In this connection, I have found that a monomer or prepolymer which has polarity and also a monomer or prepolymer which contains bi-functional groups (i.e., having more than one group that will polymerize) will serve to augment the strength of the finished film.

The following are representative examples of monomers or prepolymers which may be used in forming my liquid dispersant:

3,9 divinyl spirobi (meta-dioxane)
A methacrylate diester of a liquid polyethylene such as triethylene glycol dimethacrylate or diethylene glycol dimethacrylate
2-ethyl hexyl acrylate
Vinyl-2-ethyl-hexylether
Vinyl-2-ethyl hexoate
Vinyl-2-chloro ethyl ether
Vinyl-propionate
Butyl acrylate In a system using a monomer or prepolymer, I have found that I can assist in cross linking the monomers or prepolymers by adding a small quantity of an organic acid, such as maleic acid or crotonic acid. Where certain of the monomers are used, such as a methacrylate diester of a liquid polyethylene, a small quantity of an inhibitor should be mixed with the dispersion so as to inhibit self-polymerization at room temperature. For this purpose, I may use hydroquinone, methyl ether of hydroquinone or other suitable oxygen containing compounds.

As previously indicated, I have found that it is desirable that thixotropic characteristics be imparted to the resin dispersion with a high initial apparent viscosity while in a state of rest prior to shearing so that a relatively large proportion of heavy metal particles may be suspended in the dispersion. However, when the system is subjected to shear, the apparent viscosity level will drop, due to the thixotropic characteristic, so that the dispersion can flow whereby articles can be readily produced from the material by standard forming operations, particularly dipping, spraying and brushing. As previously indicated, my material may also be subjected to other forming operations, such as casting, molding and coating operations and for this purpose, I prefer to incorporate in the system other rheological characteristics in addition to thixotropy.

The desired thixotropic characteristics can be obtained by mixing a gelling agent with the liquid disperant, such as organophilic bentonites, for example—dimethyl diocta decyl ammonium bentonite, although other gelling agents may be employed, for example—silicone dioxide (90%) such as that available under the trademark "Santocel C" and aluminum stearate, sodium stearate and ultra-fine calcium carbonate coated with a stearate. The desired thixotropy may also be obtained by other means, as by using a plasticizer which will have a high solvating action on the resin particles, such as plasticizers with a highly developed ring structure or with a large number of side chains. Examples of plasticizers that may be used to obtain this solvating action and produce the desired thixotropy are tricresyl phosphate and tri-2-ethyl hexyl phosphate. Other plasticizers will also impart the desired thixotropic characteristics.

The initial apparent viscosity of the dispersion prior to shearing should be high enough to permit the dispersion to suspend a very high percentage of heavy metal particles in the order of between seventy-five percent and ninety-five percent of the total suspension by weight. However, the apparent viscosity should not be above the level at which it can be readily subjected to shear so as to permit the initiation of standard forming operations, as for instance—the immersion of a dip form therein. In addition, the thixotropic level should be such that when the system is subjected to shear, the apparent viscosity will reduce to a level at which the material will flow.

For this purpose, I have found that satisfactory results are obtained if the resin dispersion (prior to the addition of the heavy metal particles) at a state of rest has an absolute yield value of between seventy and three hundred dynes per square centimeter and preferably between one hundred and fifty and two hundred and twenty dynes per square centimeter. The thixotropic level should be such that when it is subjected to shear, the absolute yield value of the system should be reduced by at least fifteen percent and preferably by at least twenty percent.

In making my barrier material, I first prepare a resin dispersion binder and I thereafter suspend the heavy metal particles therein. In this connection, I first mix together the several components of the liquid dispersant and add therto the gelling agent and, where employed, I also mix the organic acid and inhibitor therewith. Where the organic acids are in solid form, they are ground to a uniform fine state prior to mixing with the other ingredients. The gelling agent may first be premixed in a twenty-five percent dispersion with one of the plasticizers employed. The several components of the liquid dispersant and also the other ingredients are mixed together as by means of a mechanical mixer until a homogeneous, uniform dispersion is obtained. Thereafter, a finely-divided resin particles and the liquid dispersant are added together and again they are thoroughly mixed as by means of a mechanical mixer and then milled on a mechanical roller mill until a uniform dispersion is obtained. The larger size resin particles are then added to this dispersion and thoroughly mixed as by means of a mechanical mixer until a uniform dispersion is obtained. While I prefer to employ a mixture of larger and smaller metal particles, I have found that I can obtain satisfactory results by using metal particles of a size between three hundred and twenty-five and forthy mesh Tyler screen, in which event I prefer to use varying size metal particles within these indicated limits. The dispersion is then deaerated under vacuum until substantially all the free air is removed therefrom. Thereafter, the heavy metal particles and the resin dispersion are mixed together, preferably under vacuum, so as to exclude the air therefrom, until a uniform suspension of the metal particles in the resin dispersion is obtained. The effectiveness of the barrier depends upon the density of the materials employed and I accordingly employ particles of heavy metal.

For the heavy metal particles, I may employ lead, iron, steel and the noble metals—such as silver, gold and platinum. However, as a practical matter, I prefer to employ lead particles.

The metal particle size may be varied. The larger the average particle size, the smaller is the surface area, per unit of volume, required to be wetted by the liquid dispersant. Practically, the upper limit of the particle size is determined by the size particle that can be suspended by the dispersion and also by the ultimate use which will be made of the barrier material. Thus, in certain instances, as in the case of gloves, excessive particle size will interfere with the flexibility and the skin-conforming fitting of the glove. On the other hand, if the particle size is too small, an excessive amount of liquid dispersant is required to suspend the metal with the result that the proportion of metal particles in the barrier material is reduced. I have found as a practical matter that I obtain satisfactory results by using larger size metal particles which will be retained on a three hundred and twenty-five mesh Tyler screen but will pass through a forty or preferably a sixty mesh Tyler screen. The smaller size metal particles will pass through the three hundred and twenty-five mesh Tyler screen. In mixing together metal particles of larger and smaller size, I have obtained satisfactory results by using between twenty percent and eighty percent by weight of the larger particle size which will be retained on the three hundred and twenty-five mesh Tyler screen and the balance of the smaller particle size which will pass through the three hundred and twenty-five mesh Tyler screen.

When the heavy metal particles have been thoroughly mixed with the resin dispersion and uniformly suspended therein, the suspension may be then formed into particles of clothing, films, coverings, and coatings of various types, preferably by dripping, spraying or brushing. As I have pointed out, my material may also be subjected to other forming operations, such as casting, molding or coating operations and in this event, I prefer to add rheological characteristics in addition to thixotropy. The article, film or material thus formed is then cured in the usual manner, by hearting in an oven on a hot plate or on a heated mold or form to a temperature of between 275° F. and 450° F. until cured. As a practical matter, the time for curing varies between a few minutes and one-half hour, depending upon the temperature and the materials employed. Upon cooling or setting an improved barrier material or film or an article made from an improved barrier film is provided which will give effective protection against certain types of radiation. Thus, the material will serve to exclude alpha and beta particles and will substantially attenuate gamma radiations and X radiations in a diagnostic, fluoroscopic and lower therapeutic range.

In preparing the resin dispersion and the barrier suspension of heavy metal particles, the proportions of the several ingredients may be varied within the hereinafter indicated ranges. As previously indicated, the resin dispersion film may be made either with a liquid dispersant composed of a plurality of plasticizers or from a liquid dispersant composed of a mixture of plasticizers and a monomer or prepolymer.

Where the liquid dispersant is made of a mixture of plasticizers, then the resin component of the dispersion should constitute between approximately forty percent and fifty percent by weight and the liquid plasticizers should constitute between approximately fifty percent and sixty percent by weight of the resin dispersion binder.

Where the liquid dispersant includes a monomer or prepolymer, then the resin component of the dispersion should constitute between approximately twenty percent and fifty percent and preferably between thirty percent and forty percent by weight; the monomer or prepolymer should constitute between approximately two and one-half percent and forty percent and preferably between five percent and twenty percent by weight and the plasticizer should constitute between approximately twenty-five percent and seventy-six percent and preferably between thirty-seven and one-half percent and seventy-two percent by weight of the resin dispersion binder. The proportion of gelling agent should be sufficient to impart the desired apparent viscosity and thixotropy thereto and for this purpose between one percent and five percent by weight of the total dispersion generally serves very satisfactorily.

In a system employing a monomer or prepolymer, the inhibitor—when employed—should constitute approximately one percent or two percent by weight and the organic acid no more than approximately five percent by weight of the total dispersion.

As previously indicated, the effectiveness of the barrier material depends to a great extend upon its density. I accordingly prefer to suspend as large a proportion as practical of heavy metal particles in the resin dispersion. I have found that I am able to suspend up to approximately ninety-five percent or more by weight of heavy metal particles in the barrier suspension material. While satisfactory results are obtained for certain purposes in materials containing in excess of seventy-five percent by weight of heavy metal particles, I prefer to employ between eighty-five and ninety-five percent by weight of heavy metal in the mixture.

The following are representative examples of barrier materials and the method of preparing the same in which the resin dispersions are made with liquid dispersants formed of a plurality of plasticizers without the addition of monomers or prepolymers:

*Example 1A*

Radiation barrier material having the following components in the indicated proportions by weight is prepared in the manner hereinafter explained:

| Ingredients: | Parts by weight |
|---|---|
| Twenty-five percent of dimethyl diocta decyl ammonium bentonite in di-2-ethylhexyl phthalate | 3.0 |
| Di-isodecyl phthalate | 22.0 |
| Octyl fatty phthalic acid esters (Ohopex Q-10) | 25.0 |

| Ingredients | Parts by weight |
|---|---|
| Polyethylene Glycol 400 Monoleate O | 2.0 |
| Finely-divided polyvinyl chloride (of small size under one micron) | 45.0 |
| Finely-divided polyvinyl chloride (of large size over one micron and averaging approx. sixty-three microns) | 5.0 |
| Finely-divided lead (of smaller size which will pass through three hundred and twenty-five mesh Tyler screen) | 600.0 |
| Finely-divided lead (of larger size retained on two hundred mesh Tyler screen and which will pass through one hundred mesh Tyler screen) | 600.0 |
| Total | 1302.0 |

The resin dispersion is prepared by first mixing together as in a mechanical mixer all of the ingredients with the exception of the heavy metal particles and the resin. When these have been thoroughly mixed together, the smaller particle size resin is mixed therewith in a mechanical mixer and milled in a mechanical roller mill to form a uniform dispersion. The larger size resin particles where employed are then added to this dispersion and thoroughly mixed as by a mechanical mixer until a uniform dispersion is obtained. The resin dispersion is then deaerated under vacuum. Thereafter, the dispersion and the lead are added to each other and mixed in a mechanical mixer under vacuum to exclude entrained gases therefrom, until a uniform suspension of the heavy metal particles is obtained. The resultant barrier material mixture or suspension is then ready to be formed by standard forming procedures, such as dipping, spraying or brushing. Thus, by dipping, spraying or brushing procedures, it may be formed into articles of protective clothing, such as gloves, jackets, and aprons. By incorporating other rheological characteristics in the system in addition to thixotropy, the material may be subjected to other forming procedures, such as casting, molding and coating. The article thus formed is cured by heating in an oven, or on a hot plate, heated form or mold to a temperature of approximately 350° F.

*Example 1B*

Radiation barrier material having the following components in the indicated proportions by weight is prepared in the manner hereinafter explained:

| Ingredients | Parts by weight |
|---|---|
| Twenty-five percent of dimethyl dioctadecyl ammonium bentonite in di-2-ethylhexyl phthalate | 2.0 |
| Di-2-ethylhexyl phthalate | 18.0 |
| Dicapryl phthalate | 15.0 |
| Tricresyl phosphate | 15.0 |
| Finely-divided polyvinyl chloride (of small size under one micron) | 45.0 |
| Finely-divided polyvinyl chloride (of large size over one micron and averaging approx. eighty microns) | 5.0 |
| Finely-divided lead (of small size which will pass through three hundred and twenty-five mesh Tyler screen) | 450.0 |
| Finely-divided lead (of large size which will be retained on two hundred mesh Tyler screen and will pass through forty mesh Tyler screen) | 700.0 |
| Total | 1250.0 |

The resin dispersion is first prepared and deaerated and and thereafter the heavy metal particles are mixed therewith in the manner indicated in Example 1A. Also, the resultant barrier material mixture or suspension is formed by standard forming procedures into the desired article and it is then cured in the manner indicated in Example 1A.

*Example 1C*

Radiation barrier material having the following components in the indicated proportions by weight is prepared in the manner hereinafter explained:

| Ingredients | Parts by weight |
|---|---|
| Twenty-five percent dimethyl dioctadecyl ammonium bentonite in tricresyl phosphate | 3.0 |
| Tricresyl phosphate | 25.0 |
| Polyethylene Glycol 400 Monooleate O | 2.0 |
| Modified polypropylene glycol dibenzoate (Plastoflex MGB) | 25.0 |
| Finely-divided polyvinyl chloride (of small size under one micron) | 35.0 |
| Finely-divided polyvinyl chloride (of large size over one micron and averaging approx. eighty microns) | 5.0 |
| Finely-divided lead (of mixed sizes between two hundred and sixty mesh Tyler screen) | 1400.0 |
| Total | 1495.0 |

The resin dispersion is first prepared and deaerated and thereafter the heavy metal particles are mixed therewith in the manner indicated in Example 1A. Also, the resultant barrier material mixture or suspension is formed by standard forming procedures into the desired article and it is then cured in the manner indicated in Example 1A.

The following are representative examples of barrier materials and the method of preparing the same in which the resin dispersions are made with liquid dispersants which include one or more plasticizers and either a monomer or prepolymer:

*Example 2A*

Radiation barrier material having the following components in the indicated proportions by weight is prepared in the manner hereinafter explained:

| Ingredients | Parts by weight |
|---|---|
| Twenty-five percent dimethyl dioctadecyl ammonium bentonite in di-2-ethylhexyl phthalate | 10.0 |
| Di-2-ethylhexyl phthalate | 30.0 |
| Polyester plasticizer G-53 | 15.0 |
| 3,9 divinyl spirobi (meta-dioxane) | 10.0 |
| Maleic acid | .5 |
| Tertiarybutyl perbenzoate | .2 |
| Finely-divided polyvinyl chloride (under one micron) | 35.0 |
| Finely-divided lead powder (of mixed sizes between three hundred and twenty-five mesh and forty mesh Tyler screen) | 900.0 |
| Total | 1000.7 |

The resin dispersion is prepared by first mixing together as in a mechanical mixer all of the ingredients with the exception of the heavy metal particles and the resin. When these have been thoroughly mixed together, the smaller particle size resin is mixed therewith in a mechanical mixer and milled in a mechanical roller mill to form a uniform dispersion. The larger particle size resin when used is then added to this dispersion and thoroughly mixed as by means of a mechanical mixer in which a uniform dispersion is obtained. The resin dispersion is then deaerated under vacuum. Thereafter, the dispersion and the lead are added to each other and mixed in a mechanical mixer under vacuum to exclude gases therefrom, until a uniform suspension of the heavy metal particles is obtained. The resultant barrier material mixture or suspension is then ready to be formed by standard forming procedures, such as dipping, spraying or brushing. Thus, by dipping, spraying or brushing procedures, it may be formed into articles of protective clothing, such as gloves, jackets and aprons. By incorporating other rheological characteristics in the system in addition to thixotropy, the material may be subjected to other forming procedures, such as casting, molding and coating. The article thus formed is cured by heating in an oven, or on a hot plate, heated form or mold to a temperature of approximately 350° F.

*Example 2B*

Radiation barrier material having the following components in the indicated proportions by weight is prepared in the manner hereinafter explained:

| Ingredients: | Parts by weight |
|---|---|
| Twenty-five percent dimethyl dioctadecyl ammonium bentonite in di-2-ethylhexyl phthalate | 10.0 |
| Di-2-ethylhexyl phthalate | 20.0 |
| Polyester-type plasticizer—Paraplex G-60 | 25.0 |
| 2-ethylhexyl acrylate (monomer) | 10.0 |
| Finely-divided polyvinyl chloride (less than one micron) | 35.0 |
| Finely-divided lead powder—MD-104 (of mixed sizes between two hundred and fifty and forty mesh Tyler screen) | 1000.0 |
| Total | 1100.0 |

The resin dispersion is first prepared and deaerated and the heavy metal particles are mixed therewith in the manner indicated in Example 2A. Also, the resultant barrier material mixture or suspension is formed by standard forming procedures into the desired article and it is then cured in the manner indicated in Example 2A.

*Example 2C*

Radiation barrier material having the following components in the indicated proportions by weight is prepared in the manner hereinafter explained:

| Ingredients: | Parts by weight |
|---|---|
| Twenty-five percent dimethyl dioctadecyl ammonium bentonite in di-2-ethylhexyl phthalate | 10.0 |
| Di-2-ethylhexyl phthalate | 28.0 |
| Polyester plasticizer—Paraplex G-53 | 15.0 |
| Methacrylate diester of liquid polyethylene such as, triethylene glycol dimethacrylate or diethylene glycol dimethacrylate | 10.0 |
| Finely-divided polyvinyl chloride (less than one micron) | 35.0 |
| Hydroquinone | .1 |
| Polyethylene Glycol 400 Monoleate O | 2.0 |
| Finely-divided lead powder (of mixed sizes between two hundred and fifty mesh and forty mesh Tyler screen) | 1900.0 |
| Total | 200.1 |

The resin dispersion is first prepared and deaerated and the heavy metal particles are mixed therewith in the manner indicated in Example 2A. Also, the resultant barrier material mixture or suspension is formed by standard forming procedures into the desired article and it is then cured in the manner indicated in Example 2A.

It should be understood that Examples 1A through 2C are merely intended as specific illustrations of satisfactory embodiments of my invention and that other materials of the type disclosed in this specification may be substituted for the specific ingredients listed in the examples and that the proportions of the ingredients may be varied within the limits indicated herein.

Under further aspects of my invention, I provide an improved method for forming plastisol materials such as the barrier material herein disclosed by an improved dipping procedure whereby undesirable dripping and running of the material is prevented. I also provide an improved laminated material in which the barrier material has laminated thereto one or more layers of a very thin resin dispersion material having greater elongation and greater tensile strength than the barrier material, together with an improved method of making the laminated material.

Under my improved dipping and forming procedure, I provide a suitable dipping form having the contour, shape and size of the interior of the article which it is desired to form.

Thus, in the accompanying drawing, I have shown a dipping form which is in the shape of a hand for use in making gloves. Under standard dipping procedures, the form is immersed in the plastisol or other preparation and a thin layer of the material adheres thereto. The dipping operation is repeated until the desired thickness is built-up on the dipping form. Between successive dips, the form and the material adhering thereto is heated to above the gelling temperature of the plastisol so as to gel the plastisol whereby the next succeeding layer can be adhered thereto. The heating is conventionally accomplished in an oven and, as the plastisol preparation is heated to the gelling temperature, the viscosity at first declines whereby the plastisol material will flow and drip. The flowing and dripping is undesirable because it results in uneven thickness of the article being formed and in weak spots. In the case of my improved barrier material, it would result in areas which do not afford sufficient protection against radiation.

Attempts have been made to minimize these undesirable results by rotating the form while it is being heated during the gelling operation for the purpose of causing the plastisol to flow evenly. However, the rotation of the form has been a cumbersome operation and the results have not been altogether satisfactory. In accordance with my improved method, I overcome these difficulties and simplify the procedure by immersing the form and the layers of plastisol deposited thereon into a material which is in the liquid phase when heated to a temperature above the gelling temperature of the plastisol and it is maintained at that elevated temperature while the form and coating layers are immersed therein. Plastisols of the type previously described herein will gel at temperatures in excess of approximately 135° C. and the gelling agent may be maintained at a temperature between approximately 135° C. and 185° C. and I have found that very satisfactory results are maintained by maintaining the gelling agent at a temperature of approximately 160° C.

As the heating or gelling agent, I may employ any material which at the temperatures indicated above is in the liquid phase and which at these temperatures will not adversely affect or dissolve the components, of the plastisol preparation. For this purpose, I may employ glycerine or any of the glycols, such as—ethylene glycol. In addition, I may employ mineral oils, molten water-soluble wax, or the like. The liquid is maintained at a temperature within the temperature range indicated above and preferably at approximately 160° C.

The dipping mold is first dipped in the plastisol preparation so as to deposit a layer of plastisol thereon and thereafter the mold with the deposited plastisol is immersed in the heated liquid so as to quickly elevate the temperature of the plastisol and cause it to gel completely. After removing the mold and deposited plastisol from the heated liquid, the liquid is removed therefrom as by washing in water or other suitable washing media which will remove the curing liquid but will not adversely affect the plastisol. After washing the mold and its deposited plastisol, it is dried as by heat or by air drying. The mold may then be subjected to repeated dipping, gelling, washing and drying operations until a layer of the desired thickness has been deposited on the mold. Thereafter, the plastisol deposited on the mold is cured by heating it in an oven to the curing temperature which is between approximately 275° F. and 450° F. I have found that curing at approximately 350° F. for approximately one-half hour produces satisfactory results.

In dip forming and otherwise forming radiation barrier material of the type herein disclosed, I have found that it is frequently desirable to impart additional strength thereto by integrally securing to one or both layers thereof a very thin layer of a resin material free from metal particles and which has greater elongation and tensile strength than the barrier material. For this purpose, I have found that very satisfactory results are obtained by using a resin dispersion made from a resin dispersed in a liquid dispersant which includes a monomer or prepolymer. The resin dispersions disclosed in Examples 2A, 2B and 2C, but omitting the heavy metal particles and the gelling agent which is unnecessary for the present purposes, serve very satisfactorily for this purpose. At any rate, the coating layers may be made from a finely-divided resin of the type previously disclosed herein, such as—polymers or copolymers of vinyl chloride dispersed in a liquid dispersant formed of one or more of the previously disclosed plasticizers and one or more of the prepolymers or monomers, all mixed in the proportions previously indicated. Also as previously indicated, an inhibitor and an organic acid may be mixed therewith. The plastisol is mixed and prepared in the manner previously described. It may be used in forming one or both surfaces of the article made from my barrier material. Where the article is formed by a dipping process as herein disclosed, the first and final plastisol dip may be made in the clear plastisol free from the heavy metal particles.

The following are representative examples of plastisol material free from heavy metal particles and the method of preparing the same which may be laminated to one or both surfaces of the barrier material:

*Example 3A*

Plastisol material free from heavy metal particles having the following components in the indicated proportions by weight is prepared in the manner hereinafter explained:

| Ingredients: | Parts by weight |
|---|---|
| Di-2-ethylhexyl phthalate (Dioctyl Phthalate) | 25.0 |
| Octyl fatty phathalic acid esters (Ohopex Q-10) | 20.0 |
| Triethylene Glycol Dimethacrylate (Monomer MG-1) | 15.0 |
| Methyl ether of hydroquinone | 4.0 |
| Polyvinyl chloride powder (of small particle size less than one mircon) | 75.0 |
| Total | 139.0 |

The resin dispersion is prepared by first mixing together in a mechanical mixer all of the ingredients with the exception of the resin. When these have been thoroughly mixed together, the resin is mixed therewith in a mechanical mixer to form a uniform dispersion. The resin dispersion is then deaerated under vacuum and is ready for use to form a coating for one or more surfaces of the barrier material by standard forming procedures, such as—dipping, spraying or brushing. Thus, it may be applied to both surfaces of the barrier material by the dipping procedure hereinafter described. After the article has been thus formed by forming procedures, it is cured by heating in an oven on a hot plate, heated form or mold to a temperature of approximately 350° F.

*Example 3B*

Plastisol material free from heavy metal particles having the following components in the indicated proportons by weight is prepared in the manner hereinafter explained:

| Ingredients: | Parts by weight |
|---|---|
| Di-isodecyl phthalate | 25.0 |
| Octyl fatty phthalic acid ester (Ohopex Q-10) | 20.0 |
| 3,9 divinyl spirobi (Meta-dioxane) | 15.0 |
| Finely-divided polyvinyl chloride (less than one micron) | 75.0 |
| Monomethyl ether hydroquinone | 1.0 |
| Total | 136.0 |

The resin is first prepared and deaerated in the manner indicated in Example 3A. Also, the resultant resin dispersion may be formed by standard forming procedures so as to provide a coating for one or both surfaces of the barrier material and is then cured in the manner indicated in Example 3A.

It should be understood that Examples 3A and 3B are merely intended as specific illustrations of satisfactory coating material for my barrier material and that other materials of the type disclosed in the specification may be substituted for the specific ingredients listed in the examples and that the proportions of the ingredients may be varied within the limits indicated herein.

In the accompanying drawing, I have indicated a dipping mold 10 to be used in forming a glove and I have also shown a container 12 for the clear plastisol material which is free from heavy metal particles and a container 14 for the barrier plastisol material. The level of the plastisols in the two containers is such as to permit the dipping of the glove mold into the plastisol to the required depth. I have also illustrated a container 16 which holds the gelling agent or heated liquid for gelling the plastisol material and which is suitably maintained at the desired elevated temperature above the gelling temperature of the plastisol material. The heated liquid in the container 16 is likewise maintained at a level to permit insertion of the mold to the desired depth. At 18, I have illustrated a water spray for washing the gelling agent from the deposited plastisol between successive dips.

In making a glove, I prefer that the inner and outer layers be a clear plastisol material so as to impart additional tensile strength to the barrier film and so as to also lend a pleasing appearance and pleasant finish to the glove. Accordingly, the dipping mold is first preferably preheated to approximately 120° F. and inserted in the clear plastisol in container 12 and after being immersed in the heated liquid in container 16 to gel the plastisol and after washing beneath the water spray 18, the mold is dried and preferably preheated to approximately 140° F. and dipped in the barrier material in container 14. The mold is again immersed in the heated liquid to gel the barrier material layer and the heated liquid is washed off with a water spray and the mold is dried. The mold is maintained at approximately 140° F. and is successively dipped in the barrier material until the desired wall thickness has been accumulated and between successive dips the gelling, rinsing and drying operations are repeated. The final finish coat is then deposited after drying by dipping the mold at approximately 120° F. in the clear plastisol in container 12. The article thus formed is cured by heating the article on the form to a temperature of between 275° F. to 450° F. until curing occurs. Curing at 350° F. for one-half hour produces very satisfactory results.

After curing, the article may be carefully stripped from the mold in the usual manner. The article thus provided has the advantage that due to the presence of the intermediate layers of barrier material, it serves to give effective protection against certain types of radiation. Thus, it will serve to exclude alpha and beta particles and will substantially attenuate gamma radiations and X radiations in the diagnostic, fluoroscopic and lower therapeutic range. In addition, due to the surface layers of clear plastic material free from heavy metal particles, the molded article will have adequate strength for normal usage. In this connection, in various types of garments, such as gloves, particularly surgical gloves, it is important that the material from which the garment is made be relatively thin. For this purpose, the surface reinforcing layers should be confined to a thickness of no more than .0075" so that a sufficient thickness of barrier material may be employed to afford effective protection.

I have found that satisfactory results are obtained by forming the surface reinforcing layers in a thickness of approximately .005" and by making the intermediate barrier material of the required thickness for the desired end use. These thicknesses can be obtained from one dip each for each of the surface layers and successive dips for the intermediate barrier layers to build-up the desired thickness. As previously indicated, between successive dips, the plastisol material should be gelled by immersing in the heated gelling material and rinsed with water and dried.

It will thus be seen that I have provided an improved radiation barrier film, together with an improved method of making the same wherein the barrier film will afford effective protection or will significantly affect certain types of radiation, which is relatively simple to make and may be dipped, sprayed or brushed into various types of protective articles, coatings and coverings and which may be made in plastisol form and has a relatively high tensile strength so that it may be used in making articles of clothing. By imparting other rheological characteristics to my material, I may also subject it to other forming operations, such as casting, molding or coating. Modifications may be made in the illustrated and described embodiments of my invention without departing from the invention as set forth in the accompanying claims.

I claim:

1. The method of making a radiation barrier which comprises: preparing a relatively viscous resin dispersion from finely divided resin particles substantially uniformly distributed in a liquid dispersant and sufficient gelling agent to impart thixotropic characteristics thereto with an initial apparent viscosity when at a state of rest at least 20% higher than the viscosity when subjected to shear so that it can suspend a relatively higher proportion of the hereinafter mentioned heavy metal particles but which apparent viscosity decreases by at least 20% when the dispersion is subjected to shear so that it can be readily formed into various articles, mixing heavy metal particles therewith to form a uniform suspension of the heavy metal particles in the dispersion with the heavy metal particles constituting at least 85% by weight of the resulting suspension, forming the resulting suspension into an article of the desired configuration, and curing the resin despersion in the article thus formed to provide a barrier material with heavy metal particles substantially uniformly distributed in the resin binder.

2. The method of having a radiation barrier as set forth in claim 1 in which the initial absolute yield value of the resin dispersion prior to shear is between one hundred fifty and two hundred twenty dynes per square centimeter and which reduces by at least twenty percent when subjected to shear.

3. The method of making a radiation barrier as set forth in claim 1 in which the resin material is selected from the group consisting of polymers and copolymers of vinylchloride and the resin particles are of mixed relatively smaller and relatively larger size with the relatively larger size particles being between approximately one micron and one hundred microns in size and constituting at least approximately ten percent by weight of the resin component.

4. The method of making a radiation barrier as set forth in claim 1 in which the liquid dispersion includes a plurality of different plasticizers, the major portion of which have compatible surface tensions confined within a range which differs from each other by no more than approximately three dynes per square centimeter.

5. The method of making a radiation barrier as set forth in claim 1 in which the resin constitutes between approximately forty percent and fifty percent by weight of the resin dispersion and the plasticizers constitute between approximately sixty percent and fifty percent by weight of the resin dispersion and the heavy metal particles constitute between approximately eighty-five percent and ninety-five percent by weight of the entire suspension.

6. The method of making a radiation barrier as set forth in claim 1 in which the heavy metal particles comprise lead particles of relatively larger and of relatively smaller size with the larger size particles being between approximately forty mesh and three hundred twenty five mesh Tyler screen and constituting in excess of approximately twenty percent by weight of the lead component three hundred twenty five mesh Tyler screen.

7. The method of making a radiation barrier as set forth in claim 1 in which the liquid dispersant consists of a mixture of plasticizers and of material selected from the group consisting of monomers and prepolymers and in which the resin constitutes between approximately twenty percent and fifty percent by weight of the resin dispersion, the monomer or prepolymer constitutes between approximately two and one-half percent and forty percent by weight of the resin dispersion and the plasticizers constitute between approximately seventy-six percent and twenty-five percent by weight of the resin dispersion and the heavy metal particles comprise between approximately eighty-five percent and ninety-five percent by weight of the total suspension.

8. A plastisol preparation for use in forming a radiation barrier comprising: heavy metal particles uniformly mixed with and suspended in a relatively viscous resin dispersion formed of finely divided resin particles dispersed in a liquid dispersant having mixed therewith sufficient gelling agent to impart thereto thixotropic characteristics with an initial apparent viscosity when at a state of rest at least 20% higher than the viscosity when the dispersion is subjected to shear so that the suspension can be readily formed into various articles, said heavy metal particles comprising at least 85% by weight of the suspension.

9. A plastisol preparation for use in forming a radiation barrier as set forth in claim 8 in which the initial absolute yield value of the resin dispersion prior to shear is between one hundred fifty and two hundred twenty dynes per square centimeter and which reduces by at least twenty percent when subjected to shear.

10. A plastisol preparation for use in forming a radiation barrier as set forth in claim 8 in which the resin material is selected from the group consisting of polymers and copolymers of vinylchloride and the resin particles are of mixed relatively smaller and relatively larger size with the relatively larger size particles being between approximately one micron and one hundred microns in size and constituting at least approximately ten percent by weight of the resin component.

11. A plastisol preparation for use in forming a radiation barrier as set forth in claim 8 in which the liquid dispersion includes a plurality of different plasticizers, the major portion of which have compatible surface tensions confined within a range which differs from each other by no more than approximately three dynes per square centimeter.

12. A plastisol preparation for use in forming a radiation barrier as set forth in claim 8 in which the resin constitutes between approximately forty percent and fifty percent by weight of the resin dispersion and the plasticizers constitute between approximately sixty percent and fifty percent by weight of the resin dispersion and the heavy metal particles constitute between approximately eighty-five percent and ninety five percent by weight of the entire suspension.

13. A plastisol preparation for use in forming a radiation barrier as set forth in claim 8 in which the heavy metal particles comprise lead particles of relatively larger and of relatively smaller size with the larger size particles being between approximately forty mesh and three hundred twenty five mesh Tyler screen and constituting in excess of approximately twenty percent by weight of the lead component and with the smaller size particles being smaller than three hundered twenty five mesh Tyler screen.

14. A plastisol preparation for use in forming a radiation barrier as set forth in claim 8 in which the liquid dispersant consists of a mixture of plasticizers and of material selected from the group consisting of monomers and prepolymers and in which the resin constitutes between approximately twenty percent and fifty percent by weight of the resin dispersion, the monomer or prepolymer constitutes between approximately two and one-half percent and forty percent by weight of the resin dispersion and the plasticizers constitute between approximately seventy six percent and twenty five percent by weight of the resin dispersion and the heavy metal particles comprise between approximately eighty five percent and ninety five percent by weight of the total suspension.

References Cited by the Examiner
UNITED STATES PATENTS

| | | | |
|---|---|---|---|
| 2,215,562 | 9/40 | Ogilby | 18—58.4 |
| 2,302,361 | 11/42 | Yngve | 260—41 |
| 2,379,976 | 7/45 | Maddock | 260—41 |
| 2,441,945 | 5/48 | Frolich et al. | 260—41.5 |
| 2,525,965 | 10/50 | Smith | 18—55 |
| 2,528,506 | 11/50 | Foyle | 18—47.5 |
| 2,748,099 | 5/56 | Bruner et al. | 252—478 |
| 2,845,660 | 8/58 | Peiler. | |
| 2,858,451 | 10/58 | Silversher | 252—478 |
| 2,867,849 | 1/59 | Drew et al. | 18—58.7 |
| 2,918,703 | 12/59 | Beal. | |
| 2,961,415 | 11/60 | Axelroad | 252—478 |

OTHER REFERENCES

"Its Done With Plastisols," Modern Plastics, December 1951, pp. 87–93, 184, 186, 189.

"Presenting Plastigels," Bakelite Review, January 1952, pp. 3–5.

CARL D. QUARFORTH, *Primary Examiner.*

OSCAR R. VERTIZ, WILLIAM J. STEPHENSON, MAURICE A. BRINDISI, ALEXANDER H. BRODMERKEL, *Examiners.*